(12) United States Patent
Liu et al.

(10) Patent No.: US 9,792,051 B2
(45) Date of Patent: Oct. 17, 2017

(54) SYSTEM AND METHOD OF APPLICATION AWARE EFFICIENT IO SCHEDULER

(71) Applicant: SAMSUNG ELECTRONICS CO., LTD., Suwon-Si, Gyeonggi-do (KR)

(72) Inventors: Fei Liu, Fremont, CA (US); Yang Seok Ki, Palo Alto, CA (US); Aakanksha Pudipeddi, Sunnyvale, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/143,238

(22) Filed: Apr. 29, 2016

(65) Prior Publication Data

US 2017/0242596 A1    Aug. 24, 2017

Related U.S. Application Data

(60) Provisional application No. 62/299,503, filed on Feb. 24, 2016.

(51) Int. Cl.

| | |
|---|---|
| *G06F 3/00* | (2006.01) |
| *G06F 13/36* | (2006.01) |
| *G06F 13/362* | (2006.01) |
| *G06F 3/06* | (2006.01) |
| *G06F 13/16* | (2006.01) |

(52) U.S. Cl.
CPC .......... *G06F 3/0613* (2013.01); *G06F 3/0659* (2013.01); *G06F 3/0685* (2013.01); *G06F 13/161* (2013.01)

(58) Field of Classification Search
CPC .............. G06F 1/329; G06F 3/0659; G06F 2003/0697; G06F 13/161

USPC .................. 710/6, 1, 12, 117, 118
See application file for complete search history.

(56) References Cited

U.S. PATENT DOCUMENTS

| | | | |
|---|---|---|---|
| 6,833,827 B2 | 12/2004 | Lui et al. | |
| 7,010,617 B2 | 3/2006 | Kampe et al. | |
| 7,996,638 B2 | 8/2011 | Robles et al. | |
| 8,751,743 B2 | 6/2014 | Burge, III | |
| 9,009,139 B2 | 4/2015 | Huang et al. | |
| 2004/0133707 A1* | 7/2004 | Yoshiya ............... | G06F 3/0611 710/6 |
| 2006/0136570 A1* | 6/2006 | Pandya ............ | G06F 17/30985 709/217 |
| 2011/0179200 A1* | 7/2011 | Sukonik ............. | G06F 13/1642 710/53 |
| 2012/0066447 A1* | 3/2012 | Colgrove ............... | G06F 3/061 711/114 |

(Continued)

FOREIGN PATENT DOCUMENTS

WO    WO 00/57296 A1    9/2000

*Primary Examiner* — Idriss N Alrobaye
*Assistant Examiner* — Getente A Yimer
(74) *Attorney, Agent, or Firm* — Lewis Roca Rothgerber Christie LLP

(57) ABSTRACT

An input output scheduler. The scheduler runs in user space and is associated with one core of a multi-core central processing unit. Applications submit input output commands to the scheduler, which queues the input output commands and submits them in batches to a mass storage device. The input output scheduler may include a plurality of command queues with different batching strategies configured to provide, e.g., different performance characteristics as measured, for example, by latency or input output throughput.

10 Claims, 7 Drawing Sheets

(56) References Cited

U.S. PATENT DOCUMENTS

| | | | |
|---|---|---|---|
| 2013/0219088 A1* | 8/2013 | Rawe | G06F 3/0605 |
| | | | 710/39 |
| 2014/0229628 A1 | 8/2014 | Mandal | |
| 2015/0139092 A1 | 5/2015 | Guo | |
| 2015/0319092 A1 | 11/2015 | Ghai | |

* cited by examiner

SYSTEM AND METHOD OF APPLICATION AWARE EFFICIENT IO SCHEDULER

CROSS-REFERENCE TO RELATED APPLICATION(S)

The present application claims priority to and the benefit of U.S. Provisional Application No. 62/299,503, filed Feb. 24, 2016, entitled "METHOD OF APPLICATION AWARE EFFICIENT IO SCHEDULER", the entire content of which is incorporated herein by reference.

FIELD

One or more aspects of embodiments according to the present invention relate to input and output operations with mass storage devices, and more particularly to an input output scheduler that runs in user space and provides, to each of a plurality of applications, a quality of service tailored to the respective application's service level agreement.

BACKGROUND

Related art input output (IO) schedulers for scheduling IO commands (e.g., read commands, write commands, and erase commands) for a mass storage device (or "persistent storage" device) may run in the kernel space of the operating system of a computer, and may receive IO commands from various applications, and schedule the IO commands without regard for the characteristics of each application. For example, some applications may prioritize (e.g., emphasize) high IO throughput, some may prioritize low IO latency, and some may prioritize having IO requests executed by a certain time (or "deadline"). Failing to take these characteristics into account may result in poor scheduler performance. Moreover, running in the kernel space may result in a loss in performance caused by the burden of frequent context switches between user space and kernel space.

Thus, there is a need for an IO scheduler providing improved performance.

SUMMARY

Aspects of embodiments of the present disclosure are directed toward an input output scheduler that runs in user space and provides, to each of a plurality of applications, a quality of service tailored to the respective application's service level agreement.

According to an embodiment of the present invention there is provided a input output (IO) scheduler for scheduling input from, and output to, a mass storage device, the scheduler including: a first command queue; and an IO sequencer, the first command queue being configured to accumulate IO commands, the IO sequencer being configured to dispatch the accumulated IO commands to the mass storage device, when a number of IO commands in the first command queue reaches a first threshold, the scheduler being configured to run in user space on a core of a computer including a multi-core central processing unit.

In one embodiment, the scheduler includes: a second command queue, the second command queue being configured to accumulate IO commands, the IO sequencer being configured to dispatch the accumulated IO commands to the mass storage device, when a number of IO commands in the second command queue reaches a second threshold.

In one embodiment, the scheduler is further configured: to receive: from a first application having a first service level agreement, IO commands and first storage performance priorities associated with the first service level agreement, and from a second application having a second service level agreement, IO commands and second storage performance priorities associated with the second service level agreement, and to place each received IO command into either the first command queue or the second command queue according to: the first storage performance priorities, the second storage performance priorities, the first threshold, and the second threshold.

In one embodiment, the scheduler is configured to place a first IO command received from the first application in the first command queue when: the first storage performance priorities emphasize low latency, and the first threshold is less than the second threshold.

In one embodiment, the scheduler is configured to place a first IO command received from the first application in the first command queue when: the first storage performance priorities prioritize high throughput, and the first threshold is greater than the second threshold.

In one embodiment, the scheduler includes a third command queue, wherein the scheduler is configured to place a first IO command received from the first application in the first command queue when the first storage performance priorities prioritize completion of command execution before a respective command completion deadline.

In one embodiment, the IO sequencer is further configured to dispatch, to the mass storage device: a first IO command in the third command queue, and a second IO command in the third command queue, when: the separation in time between: a command completion deadline of the first IO command, and a command completion deadline of the second IO command is less than a third threshold.

According to an embodiment of the present invention there is provided a computer system, including: a central processing unit including a first core; and a first mass storage device associated with the first core, the first core being configured to instantiate, in user space, a first input output (IO) scheduler for scheduling input from, and output to, the first mass storage device, the first IO scheduler including: a first command queue; and an IO sequencer, the first command queue being configured to accumulate IO commands, the IO sequencer being configured to dispatch the accumulated IO commands to the mass storage device, when a number of IO commands in the first command queue reaches a first threshold.

In one embodiment, the first IO scheduler further includes: a second command queue, the second command queue being configured to accumulate IO commands, the IO sequencer being configured to dispatch the accumulated IO commands to the mass storage device, when a number of IO commands in the second command queue reaches a second threshold.

In one embodiment, the first IO scheduler is further configured: to receive: from a first application having a first service level agreement, IO commands and first storage performance priorities associated with the first service level agreement, and from a second application having a second service level agreement, IO commands and second storage performance priorities associated with the second service level agreement, and to place each received IO command into either the first command queue or the second command queue according to: the first storage performance priorities, the second storage performance priorities, the first threshold, and the second threshold.

In one embodiment, the central processing unit further includes: a second core; and a second mass storage device associated with the second core, wherein the second core is configured to instantiate, in user space, a second IO scheduler for scheduling input from, and output to, the second mass storage device.

In one embodiment, the first IO scheduler is configured to enqueue a first request object on the first end of the message queue, and to enqueue a second request object on the first end of the message queue without waiting for a response to the first request, and the second IO scheduler is configured to dequeue the first request object from the first end of the message queue, to execute the first request object, to store, in the first request object, a result from executing the first request object, and to enqueue the first request object on the second end of the message queue.

In one embodiment, the first IO scheduler is further configured to dequeue the first request from the second end of the message queue.

In one embodiment, the first IO scheduler further includes: a second command queue, the second command queue being configured to accumulate IO commands, the IO sequencer being configured to dispatch the accumulated IO commands to the mass storage device, when a number of IO commands in the second command queue reaches a second threshold, and wherein the first IO scheduler is further configured: to receive: from a first application having a first service level agreement, IO commands and first storage performance priorities associated with the first service level agreement, and from a second application having a second service level agreement, IO commands and second storage performance priorities associated with the second service level agreement, and to place each received IO command into either the first command queue or the second command queue according to: the first storage performance priorities, the second storage performance priorities, the first threshold, and the second threshold.

In one embodiment, the first IO scheduler is configured to: place a first IO command received from the first application in the first command queue when: the first storage performance priorities prioritize low latency, and the first threshold is less than the second threshold, in the second command queue when: the first storage performance priorities prioritize high throughput, and the first threshold is less than the second threshold.

In one embodiment, the first IO scheduler further includes a third command queue, wherein the first IO scheduler is further configured to place the first IO command received from the first application in the first command queue when the first storage performance priorities prioritize completion of command execution before a respective command completion deadline, wherein the IO sequencer is further configured to dispatch, to the mass storage device: a first IO command in the third command queue, and a second IO command in the third command queue, when: a command completion deadline of the first IO command is the same as a command completion deadline of the second IO command.

According to an embodiment of the present invention there is provided a method for scheduling input and output, the method including: storing IO commands in a first command queue; dispatching the IO commands stored in the first command queue to a mass storage device, when a number of IO commands in the first command queue reaches a first threshold; storing IO commands in a second command queue; dispatching the IO commands stored in the second command queue to the mass storage device, when a number of IO commands in the second command queue reaches a second threshold; receiving: from a first application having a first service level agreement, IO commands and first storage performance priorities associated with the first service level agreement, and from a second application having a second service level agreement, IO commands and second storage performance priorities associated with the second service level agreement; and storing each received IO command in either the first command queue or the second command queue according to: the first storage performance priorities, the second storage performance priorities, the first threshold, and the second threshold.

In one embodiment, the method includes storing a first IO command received from the first application in the first command queue when: the first storage performance priorities emphasize low latency, and the first threshold is less than the second threshold.

In one embodiment, the method includes storing a first IO command received from the first application in the first command queue when: the first storage performance priorities prioritize high throughput, and the first threshold is greater than the second threshold.

In one embodiment, the scheduler is configured to place a first IO command received from the first application in the first command queue when the first storage performance priorities prioritize completion of command execution before a respective command completion deadline.

BRIEF DESCRIPTION OF THE DRAWINGS

These and other features and advantages of the present invention will be appreciated and understood with reference to the specification, claims, and appended drawings wherein:

DETAILED DESCRIPTION

The detailed description set forth below in connection with the appended drawings is intended as a description of example embodiments of a method of application aware efficient IO scheduler provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Figure 1A:
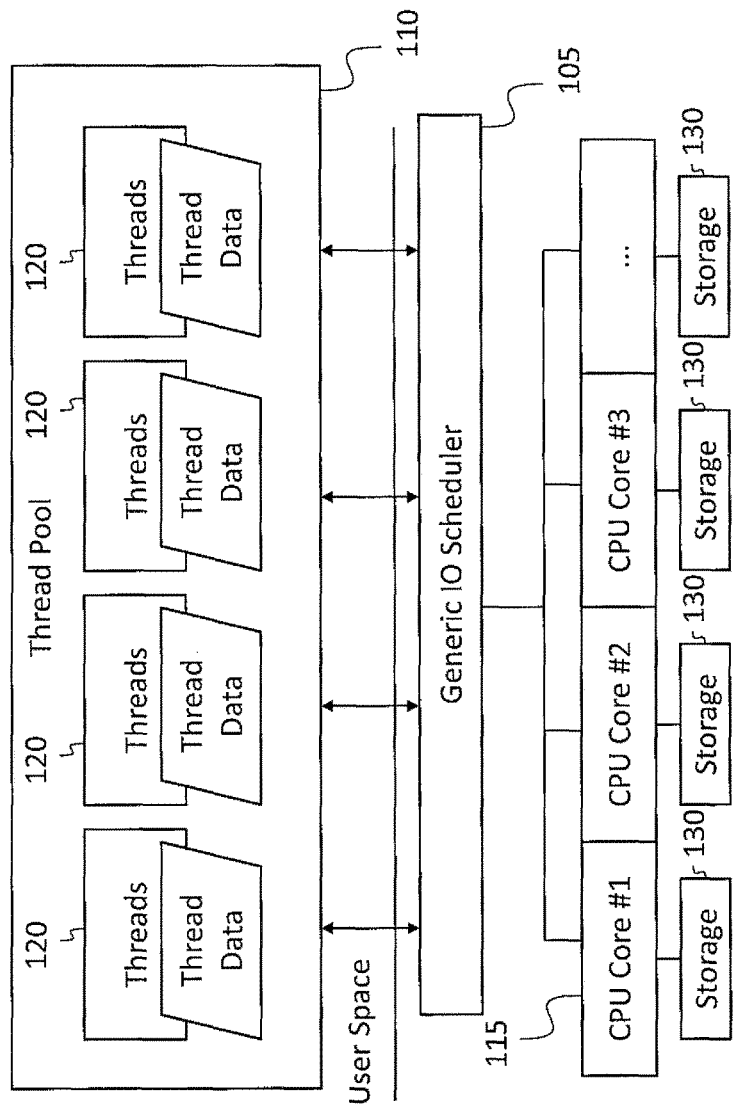
FIG. 1A is a block diagram of a multi-core computer system.

Referring to FIG. 1A, in a related art system, an input output (IO) scheduler 105 for processing IO commands for a mass storage device 130 is created in the block layer of a Linux kernel. In a system with a large number of central processing unit (CPU) cores 115, the related art IO scheduler may not utilize the CPU cores 115 efficiently in a Linux kernel, and may be a bottleneck to throughput (measured, e.g., as input output operations per second (IOPS)), because, for example, the overhead of a related art storage stack may compromise performance, because a related art IO scheduler may be unable to utilize the benefits of techniques such as nonuniform memory access (NUMA) and CPU affinity, and/or because a related art IO schedule may be a generic scheduler for the whole system. Moreover, a related art IO scheduler may not be application aware, and may provide needlessly high quality of service to applications not requiring a high quality of service, and it may provide service having characteristics that are unimportant to some applications (e.g., it may provide low latency to an application for which throughput is of primary importance).

Figure 1B:
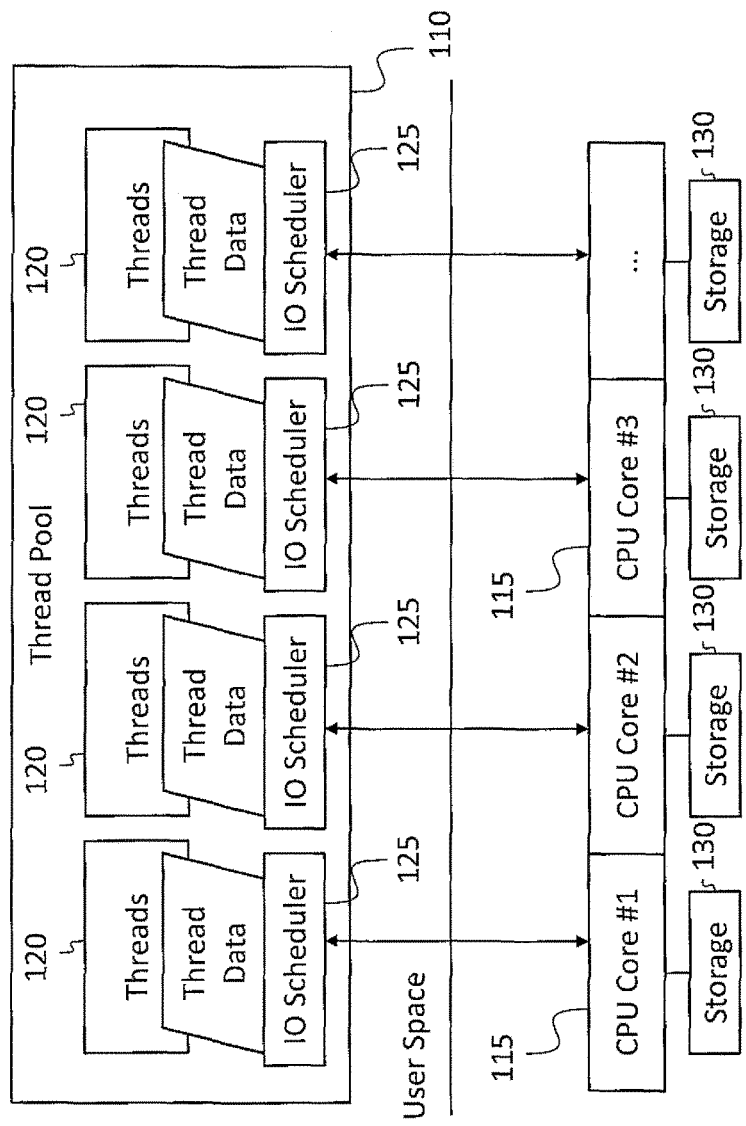
FIG. 1B is a block diagram of a multi-core computer system with a plurality of application aware user space IO schedulers, according to an embodiment of the present invention.

Referring to FIG. 1B, in one example embodiment of the inventive concepts, superior performance may be provided by an application aware user space IO scheduler 125. The application aware user space IO scheduler 125 is a software entity that runs as a thread in user space, avoiding some of the context switching incurred by a related art scheduler that runs in kernel space. The application aware user space IO scheduler 125 is able to access the device in user space directly, to reduce the overhead of IO scheduling. Because the application aware user space IO scheduler 125 is created in user space, the overhead of a related art IO stack, between device and application, may be eliminated.

In one embodiment, a dedicated application aware user space IO scheduler 125 is created for each CPU core 115. The application aware user space IO scheduler thread affiliated with each CPU core 115 allocates and deallocates memory locally to the CPU core 115. In this embodiment, because each application aware user space IO scheduler 125 is associated with a particular CPU core 115, it is also possible to support NUMA, potentially resulting in further performance improvements.

Figure 2A:
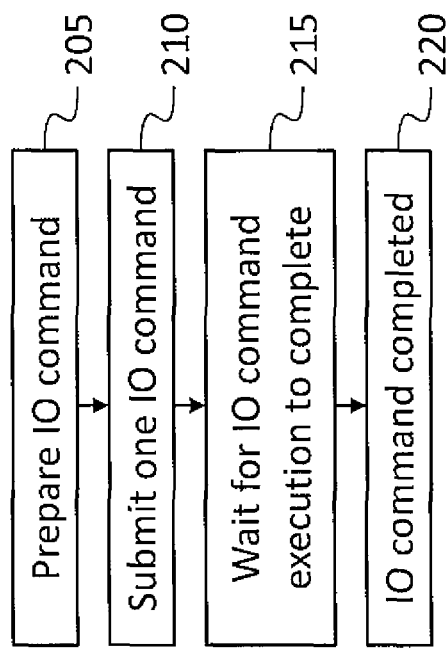
FIG. 2A is a flow chart of the processing of an IO command.

Referring to FIG. 2A, in a related art IO scheduler, IO commands may be submitted one by one through the entire IO storage stack. For example, IO commands are prepared, in an act 205, by a related art IO scheduler running in kernel space, and submitted, in an act 210, to the mass storage device by the IO scheduler. The IO scheduler then waits, in an act 215, until the execution of the IO command is completed, in an act 220. In other embodiments the IO scheduler may not wait but may return immediately and submit another command.

Figure 2B:
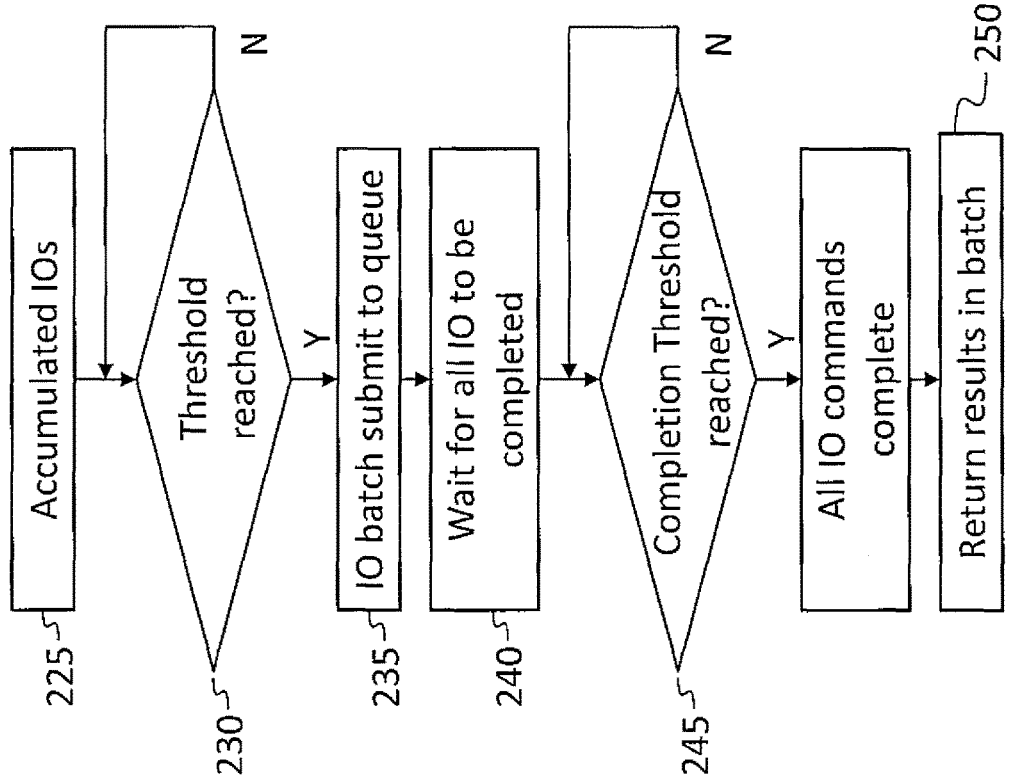
FIG. 2B is a flow chart of the processing of an IO command by an application aware user space IO scheduler, according to an embodiment of the present invention.

Referring to FIG. 2B, an application aware user space IO scheduler 125 (see also FIG. 1B) according to one example embodiment of the inventive concepts provides IO batching, so that, for example, IO commands are batched and issued (or "submitted", or "dispatched" to the mass storage device 130) in a batch instead of one by one. For example, as illustrated, in an act 225, the application aware user space IO scheduler 125 accumulates IO commands in a IO scheduler command queue, until, in an act 230, a first threshold (Threshold) is reached, and, in an act 235, the accumulated IO commands are submitted to the mass storage device 130 (i.e., to a queue in the mass storage device 130). The application aware user space IO scheduler 125 waits, in an act 240, for the commands to be completed, and when, in an act 245, a number of IO command results, accumulated in an IO command result queue, reaches a second threshold (Completion Threshold). The IO command results are then returned, in a batch, in an act 250, to the respective applications from which the IO commands originated.

An application aware user space IO scheduler 125 operating in batch mode may provide a way to schedule the execution of IO commands in a manner that is application aware, and that may improve conformance with a service level agreement (SLA) associated with an application. A service level agreement may specify, for example, a maximum latency, a minimum throughput, or that for each IO command submitted to the application aware user space IO scheduler 125 with an IO command completion deadline, the execution of the command be completed by the IO command completion deadline.

An application aware user space IO scheduler 125 may submit IO commands to a mass storage device 130 in a manner depending on the characteristics of the mass storage device 130. For example, the application aware user space IO scheduler 125 may use batch mode processing of IO commands, instead of processing IO commands individually, so that parallel processing in an SSD may result in improvements in efficiency. In some embodiments, the mass storage device 130 is a key-value mass storage device. Such a mass storage device 130 may provide performance advantages to an application, and these performance advantages may be effectively exploited by an application aware user space IO scheduler 125 that may reduce or eliminate certain performance-handicapping inefficiencies of related art schedulers.

In one embodiment, the IO commands are batched (in the act 225) into an IO scheduler command queue, in user space, managed by the application aware user space IO scheduler 125. The application aware user space IO scheduler 125 includes at least one such IO scheduler command queue, and an IO sequencer (FIG. 3; each of the modules 320-325 may include a command queue), that controls the sending of IO commands from the IO scheduler command queue to the mass storage device 130. A threshold is set for a number of IO commands in the IO scheduler command queue; once the threshold is triggered (i.e., the number of IO commands in the IO scheduler command queue reaches the threshold, in the act 230), the IO commands are submitted (in the act 235) to the mass storage device 130 in a batch mode. Higher throughput (e.g., measured as input output operations per second (IOPS)) may be realized in this manner. The application aware user space IO scheduler thread may wait (in the act 245) until the execution of all of the IO commands has been completed, and then process the completion for each IO command in a batch mode also. The application aware user space IO scheduler thread may remain pending until all of the IO commands submitted to the mass storage device 130 have been executed, instead of returning immediately. The submission of IO commands in batch mode may significantly decrease CPU overhead, and take advantage of parallelism to improve IO throughput. For example, the IO commands may be submitted to the queues in one or more batches to one or more respective NVMe devices which may each execute some of these commands in parallel per device.

Figure 3:
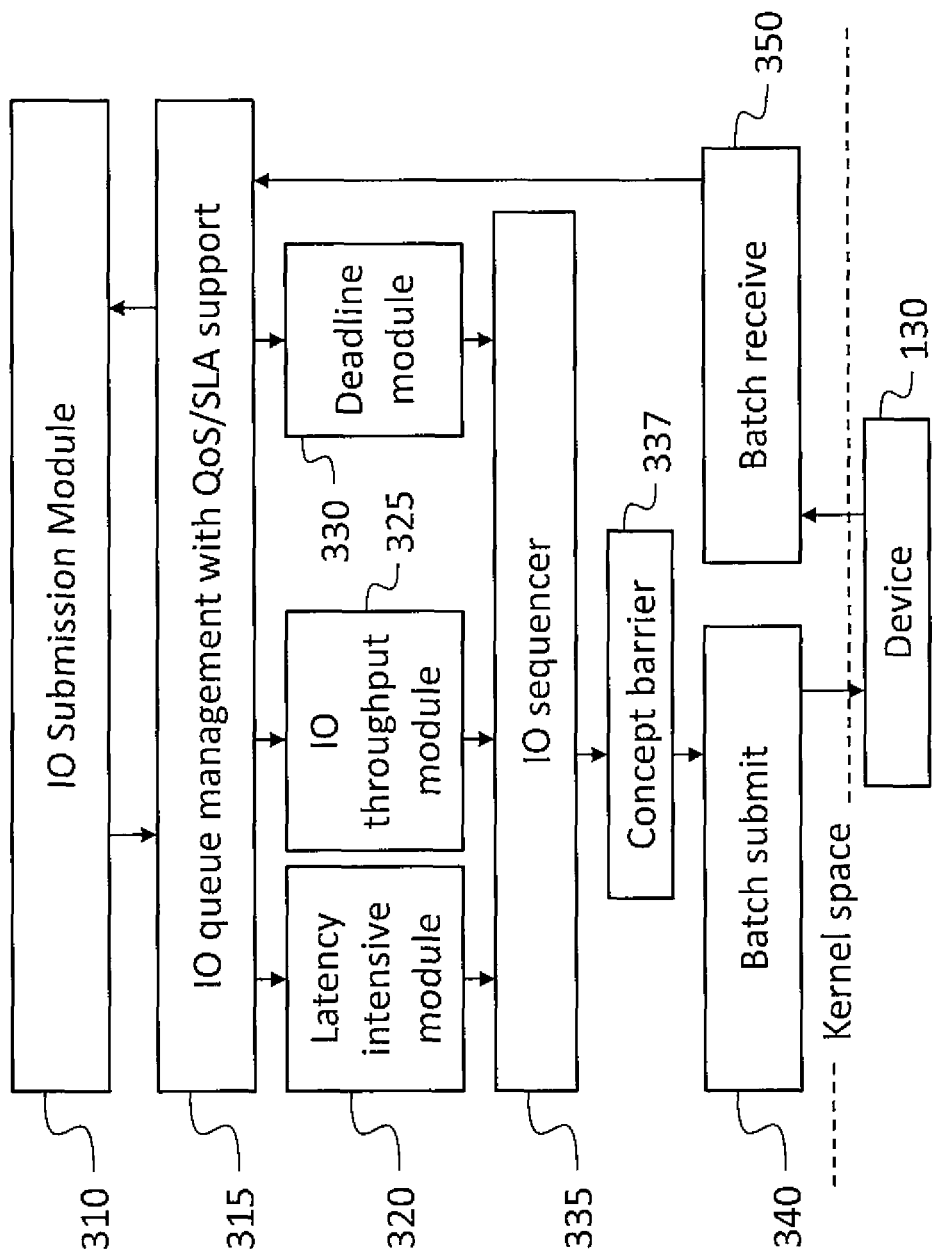
FIG. 3 is a hybrid block diagram and flow chart of an application aware user space IO scheduler, according to an embodiment of the present invention.

Referring to FIG. 3, in one example embodiment, an application aware user space IO scheduler 125 may put IO commands into different categories depending on the service level agreement of the application that submits the IO command to the application aware user space IO scheduler 125. Because the application aware user space IO scheduler 125 is created in user space, it may be closer to each application generating IO commands (than a related art IO scheduler that may be created in kernel space); this may enable the application aware user space IO scheduler 125 to obtain, from each application, information, or "hints", or "storage performance priorities" regarding how best to utilize the bandwidth of the mass storage device 130.

When the applications it supports have service level agreements, the application aware user space IO scheduler 125 may be able to receive each IO command with accompanying storage performance priorities from the application sending the IO command. An IO submission module 310, within the application aware user space IO scheduler 125, may receive IO commands from applications, and forward them to an IO queue management block 315, which may have support for quality of service (QoS) metrics and/or for service level agreements.

The application aware user space IO scheduler 125 may maintain a plurality of command queues, each configured to store one or more IO commands. Each command queue may be employed to store IO commands with certain kinds of storage performance priorities. For example a first command queue, in a latency intensive module 320, may store IO commands ("latency intensive" IO commands) for which the storage performance priorities prioritize (e.g., emphasize) low latency; a second command queue, in an IO throughput module 325, may store IO commands ("throughput sensitive" IO commands) for which the storage performance priorities prioritize high throughput; and a third command queue, in a deadline module 330, may store IO commands ("deadline sensitive" IO commands) for which the storage performance priorities prioritize IO command completion before an IO command completion deadline.

An IO sequencer 335 may then determine when to submit, or "dispatch", batches 340 of IO commands from each of the latency intensive module 320, the IO throughput module 325, and the deadline module 330, to the mass storage device 130. The IO commands for which the storage performance priorities prioritize low latency, stored in the first command queue, may be processed in relatively small batches, so that the latency incurred waiting for enough IO commands to fill a batch is relatively small. The IO commands for which the storage performance priorities prioritize high throughput may instead be processed in relatively large batches, so that the throughput reduction resulting from the overhead incurred with processing each batch is relatively small, and so that the parallelisms of the SSD may be more fully utilized. The IO commands for which the storage performance priorities prioritize IO command completion before an IO command completion deadline may be processed in batches of IO commands having the same IO command completion deadline, so that if the batch is processed in a manner that results in the IO command completion deadline being met for any of them, the IO command completion deadline is met for all of them. In some embodiments IO commands for which the storage performance priorities prioritize IO command completion before an IO command completion deadline may be batched according to proximity in time of their completion deadlines, so that, for example, two such IO commands may be included in a batch if the difference in time between their respective completion deadlines is less than a threshold amount, e.g., 0.1-5.0 ms, or, e.g., 0.1%-30% of a mean IO command completion latency.

When an IO command is completed, its result (including, e.g., the value read if the IO command is a read command) may be placed in an IO command result queue. Once sufficiently many IO command results have accumulated, the results may be returned, in a batch 350, to the application or applications that submitted the corresponding IO commands.

When IO commands are put into different command queues with different service level agreements, the order of the sequence in which the IO commands are executed may be controlled with a concept barrier 337. For two read IO commands on any logical block address or address, for example (whether a different logical block address or the same logical block address), the concept barrier may not have an effect, because the order of the read sequence may not affect any result. However, the concept barrier may serve to ensure that a write command is executed in order before any subsequently received read command on the same logical block address. For improved performance, such a write command may be put into the latency intensive module and may be executed after the write command is submitted.

In some embodiments each application aware user space IO scheduler 125 is associated with a CPU core 115, and all of the application aware user space IO schedulers 125 are independent. Each mass storage device 130 may be allocated to only one of the CPU cores 115. Certain operations, such as copying data from one mass storage device to another mass storage device, may be facilitated by an ability of the application aware user space IO schedulers 125 to communicate with each other.

Figure 4:
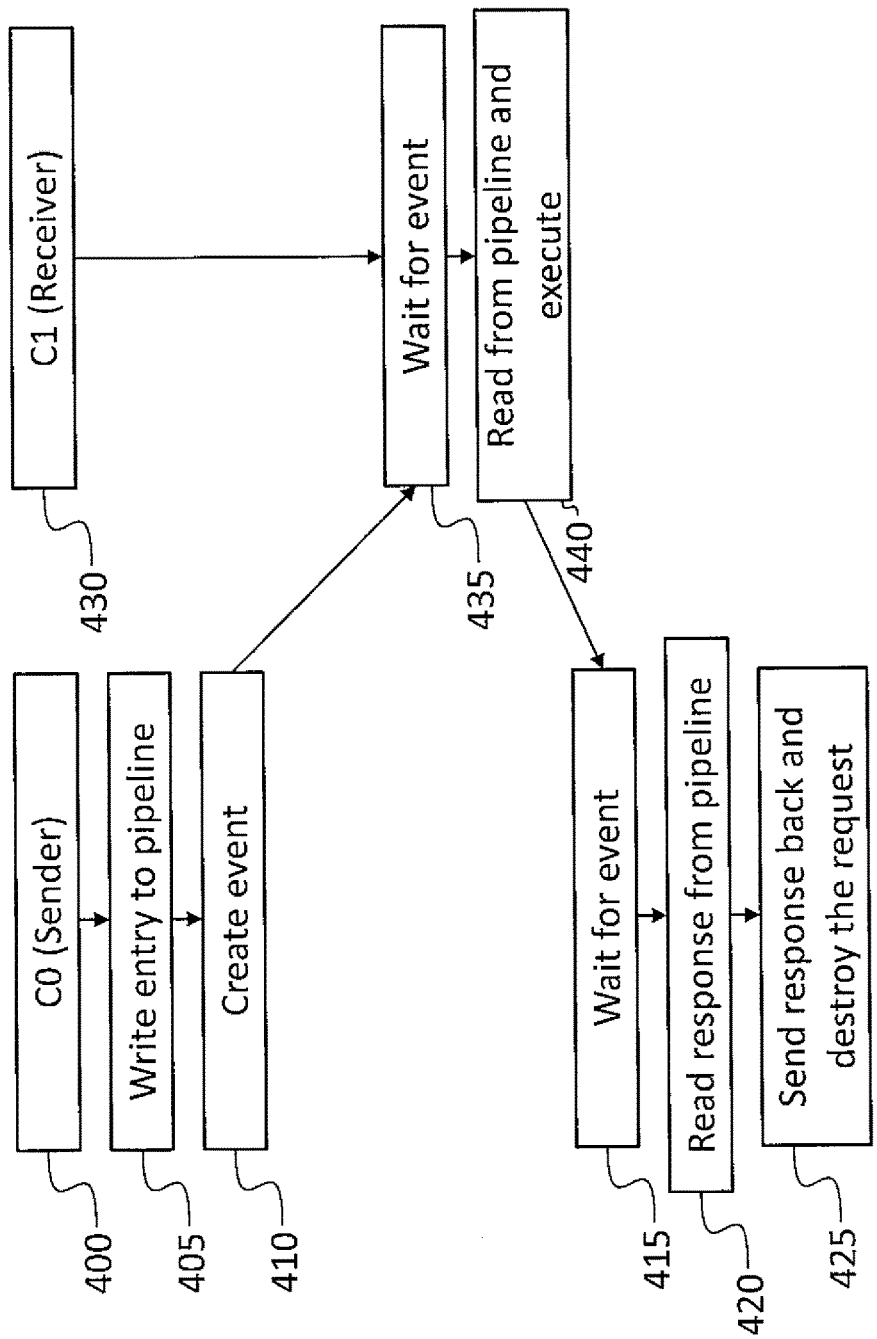
FIG. 4 is a hybrid block diagram and flow chart of communication between a sender and a receiver.

Referring to FIG. 4, in some embodiments, a related art locking mechanism may be utilized to provide data safety across multiple threads or multiple processes. The sender (C0) 400 may, in an act 405, write an entry (e.g., a message for a receiver 430) to a pipeline, create a first event, in an act 410, and then wait, in an act 415, for a second event. The receiver (C1) 430 awaits the first event, in an act 435; once the receiver 430 detects the first event, it may, in an act 440, read the entry from the pipeline, and execute it, generating the second event. The sender 400 may detect the second event, read, in an act 420, the response from the pipeline, and, in an act 425, send a response back to an application, and destroy the request (from the application) that triggered the sequence of operations.

Figure 5:
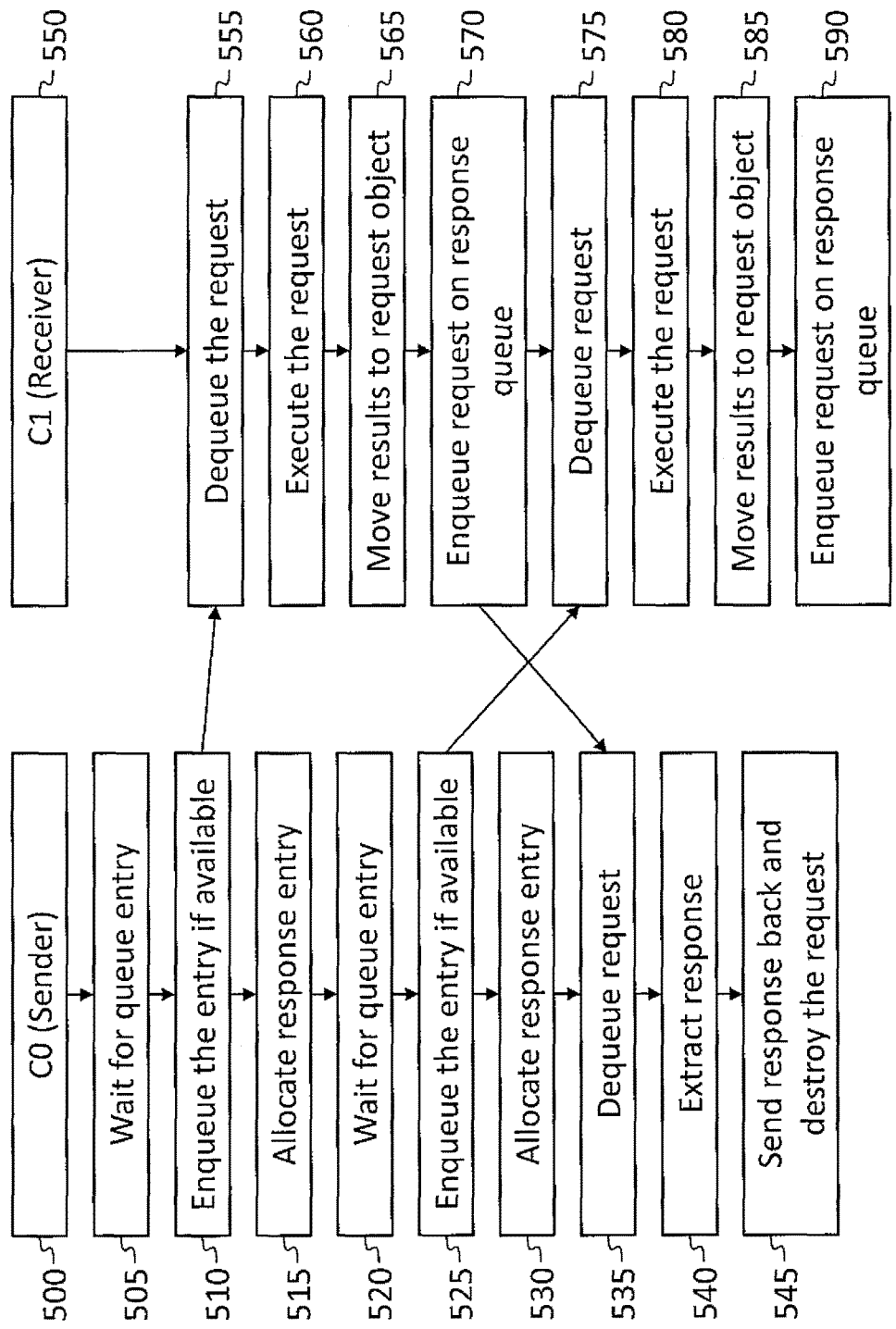
FIG. 5 is a hybrid block diagram and flow chart of communication between a sender and a receiver, according to an embodiment of the present invention.

The mechanism illustrated in FIG. 4 may incur significant overhead when executed. To avoid such overhead, a lockless message queue may be used. Referring to FIG. 5, in one embodiment, a lockless message queue has two ends, and is used to send and receive messages at both ends of the lockless message queue. A message may be a request or a response. A request entry may be enqueued by a sender 500 at a first end of the lockless message queue and dequeued by a receiver 550 at a second end of the lockless message queue. Similarly, the receiver 550 may enqueue a response that is subsequently dequeued by sender 500. For example, the sender 500 may, in an act 505, wait for a queue entry (e.g., if the lockless message queue is full, it may wait for an unused position in the lockless message queue to become available), and, in an act 510, enqueue a first request, at the first end of the lockless message queue, to be sent to the receiver 550. It may then, in an act 515, allocate memory (e.g., in the heap) for a response, wait, in an act 520, for another queue entry, enqueue, in an act 525, a second request, and allocate, in an act 530, a response entry.

The receiver 550 may concurrently, in an act 555, dequeue the first request, execute it in an act 560, move, in an act 565, the results of execution to the first request object, and enqueue, in an act 570, the first request (now including the result of the execution) on the second end of the lockless message queue. The sender may dequeue the first request in an act 535, extract, in an act 540, the response from the first request object, and in an act 545, send the response back to an application, and destroy the first request object. These operations may be repeated, concurrently, in the sender 500 and in the receiver 550. For example, the receiver may, in an act 575 dequeue the second request, execute it in an act 580, move, in an act 585, the results of execution to the second request object, and enqueue, in an act 590, the second request (now including the result of the execution) on the second end of the lockless message queue. Some of the acts illustrated in FIG. 5, e.g., acts 505-515 and acts 575-590 may be repeated in respective repeating cycles.

As can be seen from FIGS. 4 and 5, the lockless message queue of FIG. 5 permits the sender 500, instead of waiting for a response from the receiver, to continue enqueueing new requests while the receiver 550 is processing previously sent requests. In some embodiments the two corresponding CPU cores both instantiate the lockless message queue in a shared region of memory.

Thus, various embodiments of the present disclosure provide an input output scheduler that runs in user space and provides, to each of a plurality of applications, a quality of service tailored to the respective application's service level agreement.

The multi-core computer system and/or any other relevant devices or components according to embodiments of the present invention described herein may be implemented utilizing any suitable hardware, firmware (e.g. an application-specific integrated circuit), software, or a combination of software, firmware, and hardware. For example, the various components of the multi-core computer system may be formed on one integrated circuit (IC) chip or on separate IC chips. Further, the various components of the multi-core computer system may be implemented on a flexible printed circuit film, a tape carrier package (TCP), a printed circuit board (PCB), or formed on one substrate. Further, the various components of the multi-core computer system may be may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present invention.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art. As used herein, the term "major component" means a component constituting at least half, by weight, of a composition, and the term "major portion", when applied to a plurality of items, means at least half of the items.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present invention". Also, the term "exemplary" is intended to refer to an example or illustration. As used herein, the terms "use," "using," and "used" may be considered synonymous with the terms "utilize," "utilizing," and "utilized," respectively.

It will be understood that when an element is referred to as being "on", "connected to", or "coupled to", another element, it may be directly on, connected to, or coupled to, the other element, or one or more intervening elements or layers may be present. In contrast, when an element is referred to as being "directly on", "directly connected to", or "directly coupled to" another element, there are no intervening elements or layers present.

Although example embodiments of a method of application aware efficient IO scheduler have been specifically described and illustrated herein, many modifications and variations will be apparent to those skilled in the art. Accordingly, it is to be understood that a method of application aware efficient IO scheduler constructed according to principles of this invention may be embodied other than as specifically described herein. The invention is also defined in the following claims, and equivalents thereof.

What is claimed is:

1. A non-transitory computer-readable medium, having stored in it instructions that when executed by a computing device, cause the computing device to instantiate an input output (IO) scheduler for scheduling input from, and output to, a mass storage device, the scheduler comprising:
a first command queue;
a second command queue; and
an IO sequencer,
the first command queue being configured to accumulate IO commands,
the IO sequencer being configured to dispatch the accumulated IO commands of the first command queue to the mass storage device, when a number of IO commands in the first command queue reaches a first threshold, the scheduler being configured to run in user space on a core of a computer comprising a multi-core central processing unit, the second command queue being configured to accumulate IO commands, the IO sequencer being configured to dispatch the accumulated IO commands of the second command queue to the mass storage device, when a number of IO commands in the second command queue reaches a second threshold, wherein the scheduler is further configured:
to receive, from a first application, a first IO command and first storage performance priorities,
to place the first IO command in the first command queue when the first storage performance priorities prioritize low latency, and
to place the first IO command in the second command queue when the first storage performance priorities prioritize high throughput.

2. The medium of claim 1, further comprising a third command queue, wherein the scheduler is configured to place a first IO command received from the first application in the third command queue when
the first storage performance priorities prioritize completion of command execution before a respective command completion deadline.

3. The medium of claim 2, wherein the IO sequencer is further configured to dispatch, to the mass storage device:
a first IO command in the third command queue, and
a second IO command in the third command queue, when:
the separation in time between:
a command completion deadline of the first IO command, and
a command completion deadline of the second IO command is less than a third threshold.

4. A computer system, comprising:
a central processing unit comprising a first core; and
a first mass storage device associated with the first core,
the first core being configured to instantiate, in user space,
a first input output (IO) scheduler for scheduling input from, and output to, the first mass storage device,
the first IO scheduler comprising:
a first command queue;
a second command queue; and
an IO sequencer,
the first command queue being configured to accumulate IO commands,
the IO sequencer being configured to dispatch the accumulated IO commands of the first command queue to the first mass storage device, when a number of IO commands in the first command queue reaches a first threshold,
the second command queue being configured to accumulate IO commands,
the IO sequencer being configured to dispatch the accumulated IO commands of the second command queue to the first mass storage device, when a number of IO commands in the second command queue reaches a second threshold,
wherein the scheduler is further configured:
to receive, from a first application, a first IO command and first storage performance priorities,
to place the first IO command in the first command queue when the first storage performance priorities prioritize low latency, and
to place the first IO command in the second command queue when the first storage performance priorities prioritize high throughput.

5. The system of claim 4, wherein the central processing unit further comprises:
a second core; and
a second mass storage device associated with the second core,
wherein the second core is configured to instantiate, in user space, a second IO scheduler for scheduling input from, and output to, the second mass storage device.

6. The system of claim 5,
wherein the first core and the second core are configured to instantiate, in user space, a lockless message queue having a first end and a second end, and
wherein:
the first IO scheduler is configured
to enqueue a first request object on the first end of the message queue, and
to enqueue a second request object on the first end of the message queue without waiting for a response to the first request object, and
the second IO scheduler is configured
to dequeue the first request object from the first end of the message queue,
to execute the first request object,
to store, in the first request object, a result from executing the first request object, and
to enqueue the first request object on the second end of the message queue.

7. The system of claim 6, wherein the first IO scheduler is further configured to dequeue the first request object from the second end of the message queue.

8. The system of claim 6, wherein the first IO scheduler further comprises a third command queue, wherein the first IO scheduler is further configured to place the first IO command received from the first application in the third command queue when
the first storage performance priorities prioritize completion of command execution before a respective command completion deadline,
wherein the IO sequencer is further configured to dispatch, to the first mass storage device:
a first IO command in the third command queue, and
a second IO command in the third command queue, when:
a command completion deadline of the first IO command is the same as a command completion deadline of the second IO command.

9. A method for scheduling input and output, the method comprising:
storing IO commands in a first command queue;
dispatching the IO commands stored in the first command queue to a mass storage device, when a number of IO commands in the first command queue reaches a first threshold;
storing IO commands in a second command queue;
dispatching the IO commands stored in the second command queue to the mass storage device, when a number of IO commands in the second command queue reaches a second threshold;
receiving:
from a first application having a first service level agreement, IO commands and first storage performance priorities associated with the first service level agreement, and from a second application having a second service level agreement, IO commands and second storage performance priorities associated with the second service level agreement; and storing a first received IO command of the IO commands
- in the first command queue when storage performance priorities received with the first received IO command prioritize low latency, and
- in the second command queue when storage performance priorities received with the first received IO command prioritize high throughput.

10. The method of claim 9, further comprising storing the first received IO command in a third command queue when storage performance priorities received with the first received IO command prioritize completion of command execution before a respective command completion deadline.

* * * * *